3,412,553
HYDRAULIC TRANSMISSION SYSTEMS
John Thomas Matthew Wright, 23 Grosvenor Road,
Birkdale, Southport, Lancashire, England
Filed Oct. 4, 1966, Ser. No. 584,125
2 Claims. (Cl. 60—53)

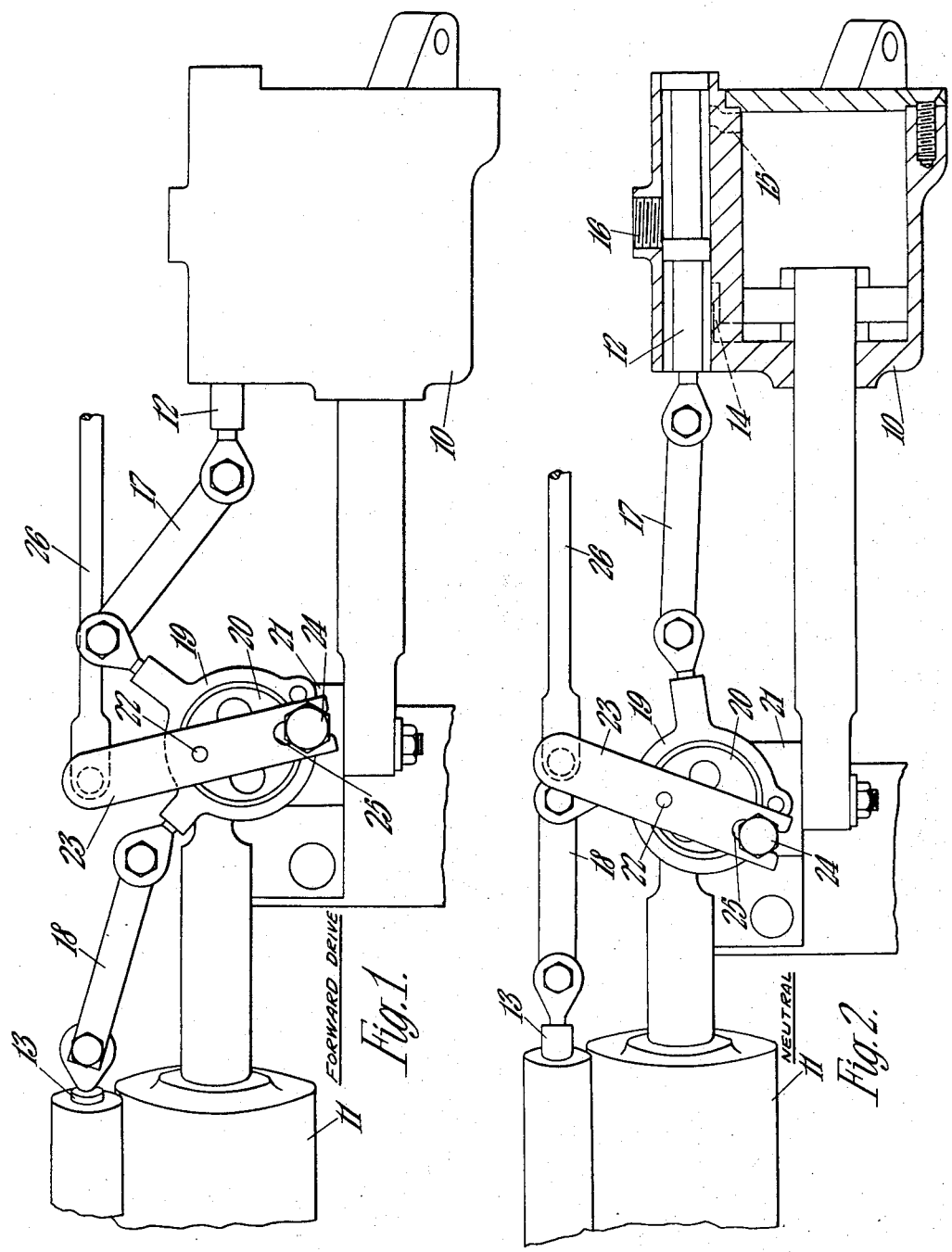

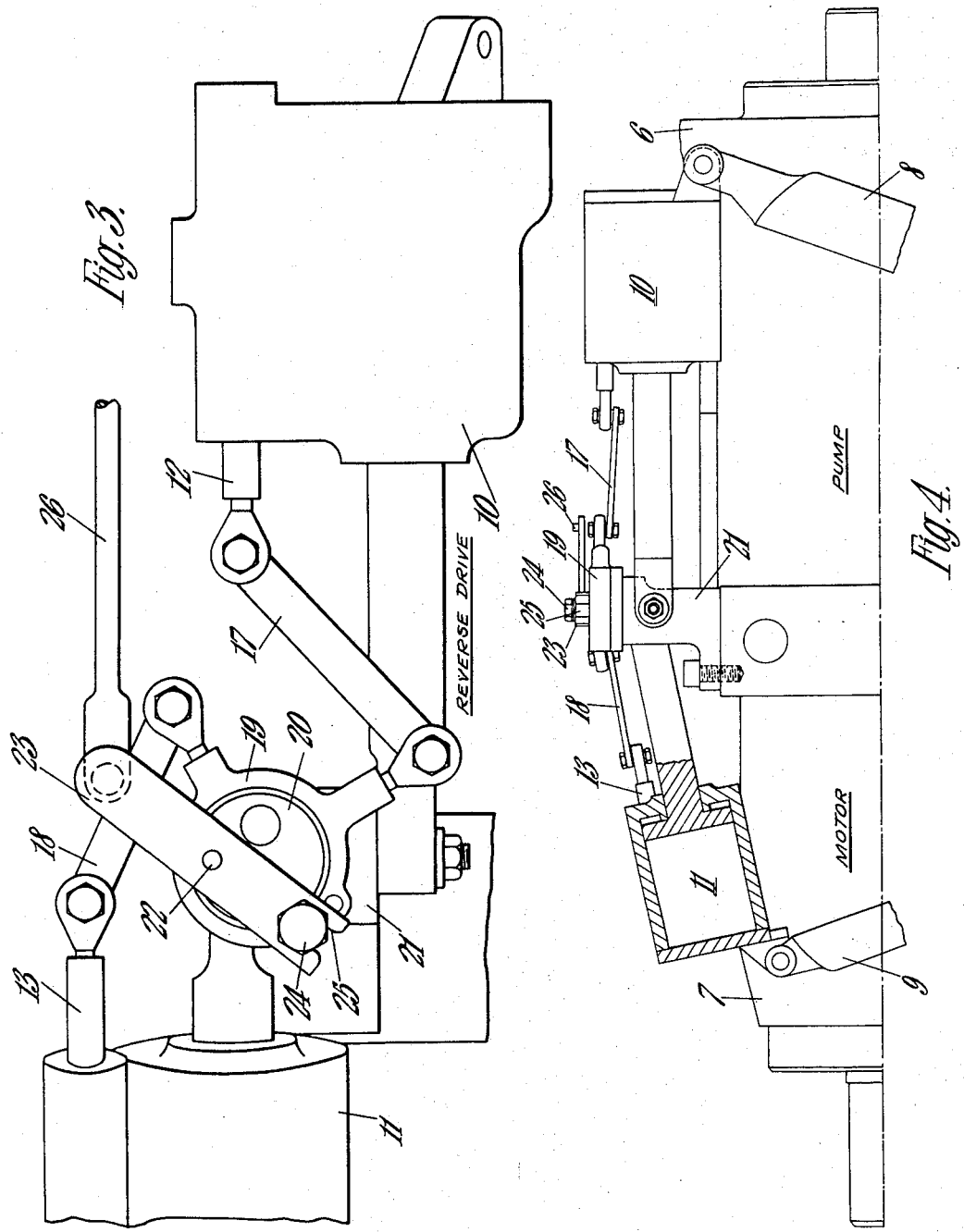

ABSTRACT OF THE DISCLOSURE

An hydraulic transmission system having a variable capacity hydraulic pump and a variable capacity hydraulic motor, to which the pump supplies motive fluid, the pump and motor having respective servo mechanisms for adjusting their capacities and the servo mechanisms being controlled by a pair of spool valves respectively. The spool valves being connected by rigid rods to a common angularly movable member and the spools being capable of substantial travel without change in the direction of control of the associated servo mechanism, and the arrangement being such that angular movement of the angularly movable member in one direction causes substantial change in the pump capacity and small change in the motor capacity and rotation in the other direction has the opposite effect.

---

This invention relates to hydraulic transmission systems of the kind comprising in combination a variable capacity hydraulic motor, a variable capacity hydraulic pump for supplying motive liquid to the motor, a pair of servo-mechanisms for adjusting the capacities of the motor and pump respectively, and a pair of spool valves for controlling the flow of liquid to and from the pair of servo-mechanisms respectively.

The object of the present invention is to provide such a system in a convenient form.

According to the invention an hydraulic transmission system of the kind specified has the pair of spool valves connected to a pair of pivots respectively on a common angularly movable member, and the pair of spool valves are both permitted limited movement without substantially changing the flow of liquid to the respective servo-mechanisms, the arrangement being such that angular movement of the member in one direction from a predetermined position will cause a change of the capacity of the motor without substantially changing the capacity of the pump, whilst angular movement of the member in the opposite direction from said predetermined position will reduce the pump capacity without substantially changing the capacity of the motor.

The invention will now be described by way of example with reference to the accompanying drawings in which:

FIGURE 1 is a plan view partly in cross-section showing part of a transmission system for a vehicle, FIGURES 2 and 3 are plan views illustrating part of a transmission system for a vehicle in three different positions, respectively, and FIGURE 4 is a side view partly in elevation and partly in cross section.

In this example, the transmission system includes an hydraulic motor 6 and an hydraulic pump 7 the casings only of which are shown, each being of the variable stroke swash plate type and each having an associated piston and cylinder servo-mechanism 10, 11 for moving the swash plates 8,9 respectively.

In each of these mechanisms the piston is stationary and the cylinder is movable relatively to the piston and is connected to the swash plate of the pump or motor. Furthermore, the cylinders carry, in respective bores, spool valves 12 and 13 respectively, for controlling the flow of liquid to and from the opposite ends of the cylinders of the mechanisms respectively. As seen in the cross-sectional view of the mechanism 10, the spool valve 12 has two spaced lands which can occupy positions in which two passages 14, 15, leading to opposite ends of the cylinder of the mechanism respectively, are closed. The distance between the lands is such that after initial movement from such a position, substantial further movement can take place without further changes in flow, and FIGURE 2 shows an intermediate position. An inlet 16 is provided for the admission of liquid to the bore for the spool valve this being, in use, connected to a source of liquid under pressure in the system, though this connection is not shown.

The spool valves 12, 13 are connected by respective universally jointed connecting rods 17, 18 to two arms which, in this example, are of unequal length, the two arms being formed on an angularly movable bell crank member 19, mounted upon a hub 20 which is fixed to a block 21 to which the pistons of the servo-mechanisms 10, 11 are also fixed. The entire assembly of parts shown in the drawings, together with the pump and motor are moreover, enclosed within a casing (not shown) the interior of which contains liquid for circulation in the system. Connected to the member 19 is a lever 23 which is pivotally connected at its mid-region to the hub 20 by means of a pin 22, the position of this pin 22 being offset from the pivotal axis of the member 19. One end of the lever 23 is connected to the member 19 via a pin 24 through a slot 25 whilst the opposite end is connected to an operator controlled lever 26. Angular movement of the lever 23 through a predetermined distance therefore results in corresponding angular movement of the member 19.

In use, the angular movement of the member 19 moves the spool valves 12, 13 in the servo-mechanisms 10, 11 and the arrangement is such that the cylinders tend to move to maintain equilibrium conditions in which the passages 14 and 15 are closed.

The angular relationship of the arms of the member 19 is such that from a position shown in FIGURE 1, which is equivalent to a forward drive position, angular movement of the member 19 in an anti-clockwise direction will result in no change in stroke of the pump due to the permitted travel of the valve without change of the servo piston, as the latter is at the end of its travel, but travel will result in a substantial change in the angle of the swash plate of the motor by means of the servo-mechanism 10. This provides overdrive conditions.

Movement of the member 19 in the clockwise direction from the position shown in FIGURE 1 will, however, result in a substantial change in the pump stroke with no change in the motor stroke. The position illustrated in FIGURE 2 is a neutral position and FIGURE 3 illustrates a reverse position. Clearly, as either arm of the member 19 approaches the nearest spool, the less will be the linear movement of that valve spool but, as shown, the opposite effect applies to the other arm and valve spool. A spring loaded detent (not shown) is provided for engaging the level 23 in the neutral position.

Having thus described my invention what I claim as new and desire to secure by Letters Patent is:

1. An hydraulic transmission system comprising a variable capacity hydraulic motor, a variable capacity hydraulic pump for supplying motive liquid to the motor, a pair of servo mechanisms arranged to adjust the capacities of the pump and motor respectively, a pair of spool valves arranged to control the flow of liquid to and from the servo-mechanisms respectively, rigid rods pivotally connected to the spools of the valves respectively, an angularly movable member to which the rods are pivotally connected at angularly spaced positions, a control operatively connected to the angularly movable member, the pair of spool valves being both permitted limited movement without changing the direction of flow of liquid to or from the respective servo-mechanisms, and the angular spacing of the connections between the rods and the angularly movable member being such that angular movement of said member in one direction from a predetermined position will cause a change of the capacity of the motor only whilst angular movement of said member in the opposite direction from said predetermined position will change the pump capacity only.

2. An hydraulic transmission system as claimed in claim 1 in which the pump and motor are of the variable capacity swash plate type, the servo-mechanisms being of piston and cylinder type.

References Cited

UNITED STATES PATENTS

| | | | |
|---|---|---|---|
| 2,985,144 | 5/1961 | Trippel | 60—53 |
| 3,107,490 | 10/1963 | Cooper et al. | 60—53 |
| 3,126,707 | 3/1964 | Hann et al. | 60—53 |
| 3,157,998 | 11/1964 | Harris | 60—53 |
| 3,284,999 | 11/1966 | Lease | 60—53 XR |

EDGAR W. GEOGHEGAN, *Primary Examiner.*